United States Patent
Liang et al.

(10) Patent No.: US 10,884,108 B2
(45) Date of Patent: Jan. 5, 2021

(54) LIGHT DETECTION AND RANGING SYSTEM

(71) Applicant: NATIONAL CHUNG SHAN INSTITUTE OF SCIENCE AND TECHNOLOGY, Taoyuan (TW)

(72) Inventors: Chao-Wen Liang, Taichung (TW); Shih-Che Chien, Hsinchu (TW); Yu-Sung Hsiao, Taoyuan (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 419 days.

(21) Appl. No.: 15/823,750

(22) Filed: Nov. 28, 2017

(65) Prior Publication Data
US 2019/0162828 A1   May 30, 2019

(51) Int. Cl.
*G01S 7/481*  (2006.01)
*G01S 17/89*  (2020.01)

(52) U.S. Cl.
CPC .......... *G01S 7/4817* (2013.01); *G01S 7/4812* (2013.01); *G01S 7/4814* (2013.01); *G01S 7/4816* (2013.01); *G01S 17/89* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,118,109 A * | 10/1978 | Crawford | ............. | G02B 26/108 |
| | | | | 359/196.1 |
| 4,988,190 A * | 1/1991 | Miles | ...................... | G01P 5/001 |
| | | | | 356/28 |
| 5,862,001 A * | 1/1999 | Sigler | ...................... | G02B 1/06 |
| | | | | 359/211.1 |
| 7,580,127 B1 * | 8/2009 | Mayor | ................... | G01N 21/21 |
| | | | | 356/337 |
| 9,068,952 B2 * | 6/2015 | Petrenko | ............ | G01N 21/8806 |
| 10,197,791 B2 * | 2/2019 | Choiniere | ............. | G02B 26/08 |
| 2005/0174504 A1 * | 8/2005 | Hashimoto | .......... | G11B 7/1369 |
| | | | | 349/54 |
| 2006/0291053 A1 * | 12/2006 | Robinson | ............... | G02B 30/25 |
| | | | | 359/465 |

(Continued)

*Primary Examiner* — Isam A Alsomiri
*Assistant Examiner* — Amir J Askarian
(74) *Attorney, Agent, or Firm* — Schmeiser, Olsen & Watts, LLP (57) ABSTRACT

A light detection and ranging system comprises an optical transmitter for beam scanning on a scan region, and receiving reflected light from the scan region; and an optical receiver for directing the reflected light for signal conversion. The optical transmitter includes a beam refractive unit including optical refractive devices, rotatably disposed about a rotation axis, for directing a collimated laser beam from a first optical path towards a direction depending on rotation angles of the optical refractive devices; and a motion unit for actuating relative motion of the optical refractive devices so as to perform beam scanning towards directions on the scan region. The optical receiver includes an off-axis reflective unit, disposed in the first optical path, for directing the reflected light towards a second optical path; and a light detection unit, disposed in the second optical path, for performing signal conversion on the reflected light.

9 Claims, 6 Drawing Sheets

(56) References Cited

U.S. PATENT DOCUMENTS

| | | | |
|---|---|---|---|
| 2011/0075234 A1* | 3/2011 | Ullman | F41H 13/0062 |
| | | | 359/221.2 |
| 2011/0285981 A1* | 11/2011 | Justice | G01S 7/4813 |
| | | | 356/4.01 |
| 2012/0188467 A1* | 7/2012 | Escuti | G02B 27/286 |
| | | | 349/1 |
| 2014/0008549 A1* | 1/2014 | Theriault | G01N 21/64 |
| | | | 250/459.1 |
| 2014/0118740 A1* | 5/2014 | Fontaine | G01L 1/241 |
| | | | 356/364 |
| 2017/0336499 A1* | 11/2017 | Ito | G01S 7/481 |
| 2018/0164408 A1* | 6/2018 | Hall | A61C 19/063 |
| 2018/0188376 A1* | 7/2018 | Yi | G01S 7/484 |
| 2018/0275249 A1* | 9/2018 | Campbell | G01S 7/4817 |
| 2018/0275275 A1* | 9/2018 | Lundquist | G01S 7/4817 |
| 2019/0041518 A1* | 2/2019 | Spickermann | G01S 17/93 |
| 2019/0107623 A1* | 4/2019 | Campbell | G02B 26/101 |
| 2020/0033454 A1* | 1/2020 | Hong | G01S 7/4865 |
| 2020/0256965 A1* | 8/2020 | Moench | G01S 17/36 |

\* cited by examiner

FIG. 9

LIGHT DETECTION AND RANGING SYSTEM

FIELD OF THE INVENTION

The present disclosure relates to an optical detection system, and in particular to a light detection and ranging (LIDAR) system.

BACKGROUND OF THE INVENTION

As intelligent transportation systems are rapidly evolving, there are increasing demands on light detection and ranging (LIDAR) products. These products generally are expensive because optical systems of them are manufactured and tuned in high cost. In addition, the optical system has their limitations on energy efficiency usage and so on and thus the resolution or accuracy of the detection is influenced. Thus, these limitations, among others, should be concerned deliberately when a LIDAR product is employed for specific applications.

For example, a conventional LIDAR system has a beam projection subsystem with a laser light source and a beam detection subsystem with a lens array and detector array for receiving the reflected light. Since the reflected light has to be distributed to the detectors through the lens array, energy loss is inevitable and energy efficiency usage is low, resulting in lower sensitivity of the LIDAR system. In this case, one way of increasing sensitivity is to enhance the power of the laser light source of the system. A high power laser light source may be required, leading to an increase in the cost of the whole system, and the energy efficiency usage is still not improved.

The above conventional LIDAR system having a beam detection subsystem with a lens array and detector array for receiving the reflected light is of low energy efficiency usage and the circuit and optical implementation are complex, leading to high cost of manufacturing. Thus, it is desirable to have a LIDAR system with enhanced energy efficiency, reduced complexity, and reduced cost.

SUMMARY OF THE INVENTION

An objective of the present disclosure is to provide a light detection and ranging (LIDAR) system with enhanced energy efficiency, reduced complexity, and reduced cost.

To achieve at least the above objective, the present disclosure provides a light detection and ranging system, comprising: an optical transmitter and an optical receiver. The optical transmitter is for beam scanning on a scan region, and receiving reflected light from the scan region. The optical transmitter including: a beam refractive unit and a motion unit. The beam refractive unit includes a plurality of optical refractive devices rotatably disposed with respect to a rotation axis and is for directing a collimated laser beam from a first optical path towards a direction depending on corresponding rotation angles of the optical refractive devices with respect to the rotation axis. The motion unit is mechanically coupled to the optical refractive devices and is for actuating relative motion of the optical refractive devices with respect to the rotation axis so as to perform beam scanning based on directing the collimated laser beam towards a plurality of directions (positions) on the scan region. The optical receiver is for directing the reflected light for signal conversion. The optical receiver including: an off-axis reflective unit and a light detection unit. The off-axis reflective unit, disposed in the first optical path, is for directing the reflected light received by the optical refractive devices towards a second optical path. The light detection unit, disposed in the second optical path, is for performing signal conversion on the reflected light.

In an embodiment, the optical transmitter further comprises a laser unit. The laser unit includes a laser source and a collimating device. The collimating device, optically coupled to the laser source, is for producing the collimated laser beam.

In an embodiment, in the optical receiver, the off-axis reflective unit includes an off-axis parabolic mirror with at least one hole for the collimated laser beam from the first optical path to pass through.

In an embodiment, the light detection unit comprises a first light detector, disposed on a focus of the off-axis parabolic mirror.

In an embodiment, the light detection unit further comprises a beam splitter and a second light detector; the beam splitter is disposed between the off-axis parabolic mirror and the first light detector; and the beam splitter is disposed between the first light detector and the second light detector.

In an embodiment, the LIDAR system further comprises a polarization switch, disposed between the off-axis reflective unit and the beam refractive unit, for selectively polarizing the collimated laser beam and the reflected light.

In an embodiment, the LIDAR system further comprises a processing unit, electrically coupled to the motion unit and the light detection unit, for outputting control signals to the motion unit for performing the beam scanning towards the plurality of directions (positions) on the scan region and receiving from the light detection unit a plurality of detection signals corresponding to the plurality of directions (positions) on the scan region.

In an embodiment, the plurality of optical refractive devices including a first optical refractive device and a second optical refractive device, the processing unit is for outputting the control signals to the motion unit so as to perform the beam scanning based on the first and second optical refractive devices rotating in different angular velocities.

In an embodiment, the processing unit is for generating a detection image corresponding to the scan region, based on the detection signals.

In an embodiment, the processing unit is for controlling the motion unit to perform the beam scanning on the scan region at a beam scanning rate based on resolution of the detection image to be required, wherein the beam scanning rate indicates number of times per a unit time that the beam scanning is performed on the scan region.

In an embodiment, the processing unit is for controlling the motion unit to actuate the relative motion of the optical refractive devices at an angular speed based on resolution of the detection image to be required.

DETAILED DESCRIPTION OF THE PREFERRED EMBODIMENTS

To make it easier for the understanding of the objects, characteristics and effects of this present disclosure, embodiments together with the attached drawings for the detailed description of the present disclosure are provided.

Figure 1:
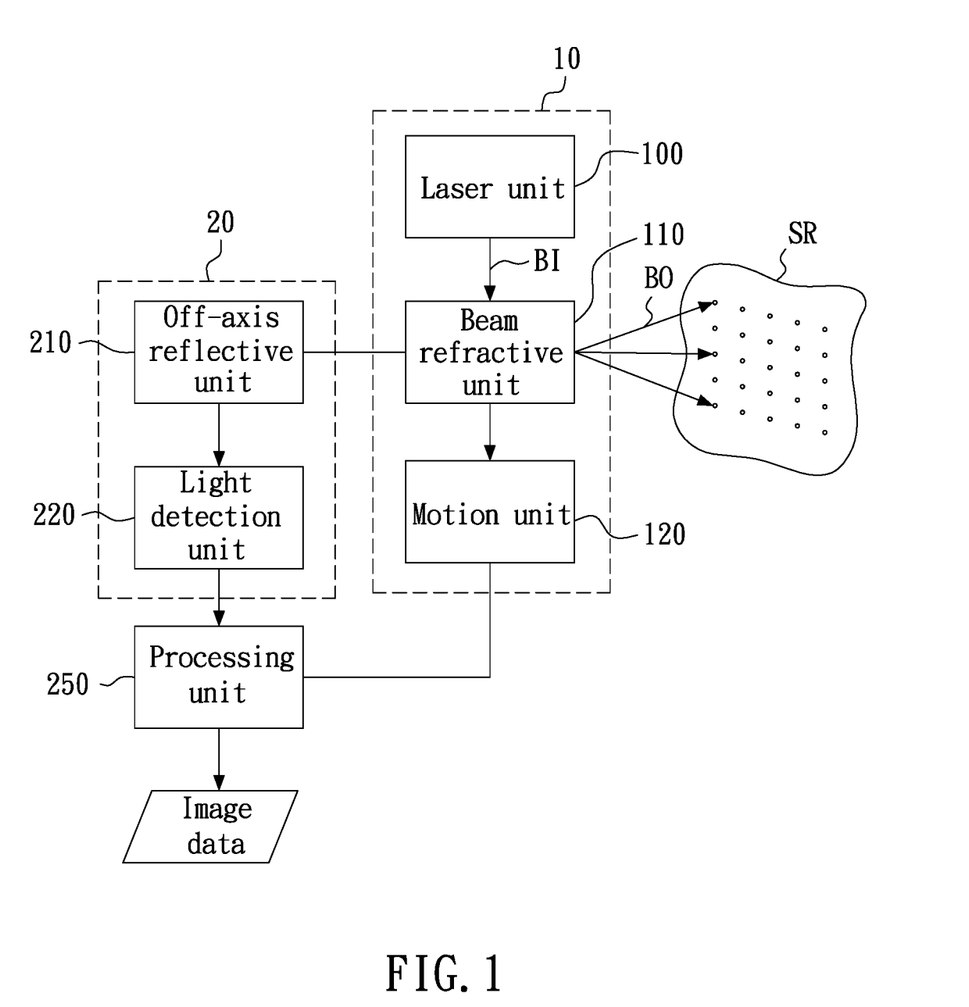
FIG. 1 is a block diagram illustrating a light detection and ranging (LIDAR) system according to one embodiment of the present disclosure.

Referring to FIG. 1, a light detection and ranging (LIDAR) system is illustrated according to an embodiment of the present disclosure in a block diagram form. In FIG. 1, a light detection and ranging (LIDAR) system comprises an optical transmitter 10 and an optical receiver 20. The optical transmitter 10 is for beam scanning on a scan region SR, and receiving reflected light from the scan region SR. The optical transmitter 10 includes a beam refractive unit 110 and a motion unit 120. The motion unit 120 is mechanically coupled to the beam refractive unit 110. For example, an output laser beam BO is scanned on the region SR with different directions (or positions) and reflected light is received through the optical transmitter 10. The optical transmitter 10 may also include a laser unit 100, optically coupled to the beam refractive unit 110, for producing a collimated laser beam BI. The optical receiver 20 is optically coupled to the optical transmitter 10 and is employed for directing the reflected light for signal conversion. The optical receiver 20 includes an off-axis reflective unit 210 and a light detection unit 220. The off-axis reflective unit 210 is optically coupled to the light detection unit 220.

The LIDAR system may further comprise a processing unit 250, electrically coupled to the motion unit 120 and the light detection unit 220. The processing unit 250 is employed to control the motion unit 120 and receive signals from the light detection unit 220 in order to produce corresponding image data. The processing unit 250 may include a processor, microcontroller, digital signal processor, system on a chip (SOC), field programmable gate array (FPGA) and application-specific integrated circuit (ASIC), or a computer system. The lase unit 100 can be a semiconductor or solid-state laser source. However, the present disclosure is not limited to the laser unit 100 and the processing unit 250. That is, when the LIDAR system is implemented, either the laser unit 100 or the processing unit 250, or both, may be regarded as an environmental or optional component(s) according to a user requirement or a product requirement.

Figure 2:
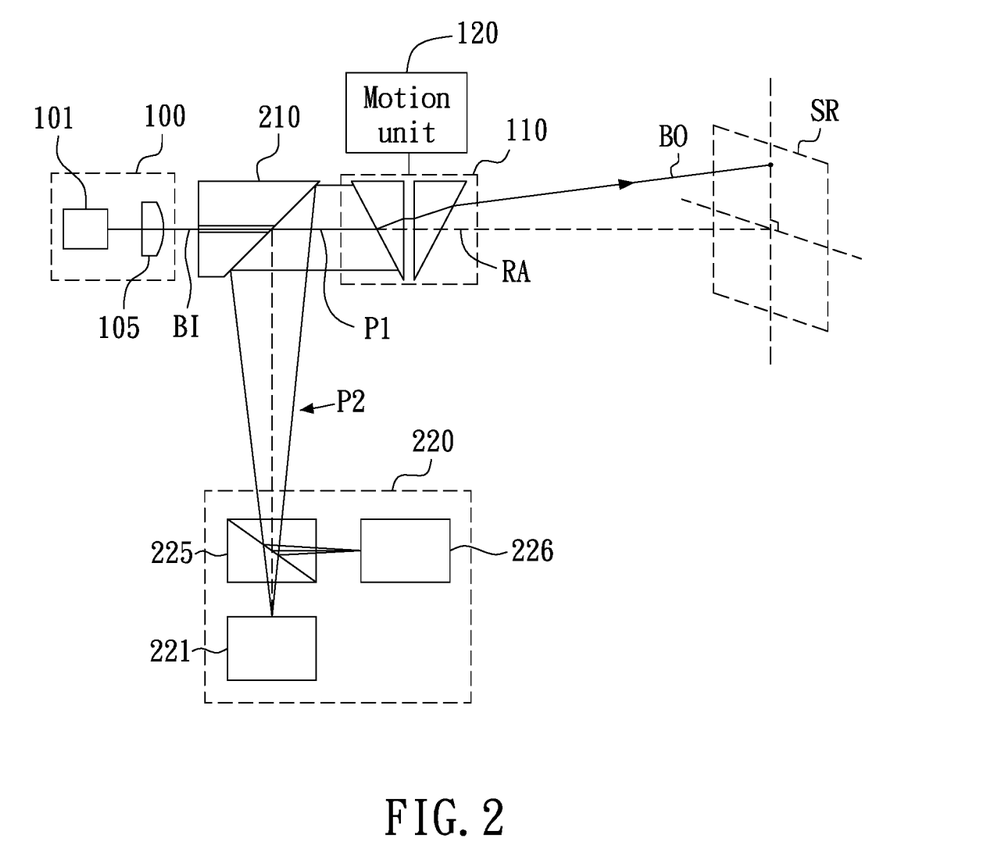
FIG. 2 is a schematic diagram illustrating a LIDAR system and its optical paths according to one embodiment of the present disclosure.

Referring to FIG. 2, the LIDAR system according to FIG. 1 is illustrated with optical paths. The beam refractive unit 110 includes a plurality of optical refractive devices rotatably disposed with respect to a rotation axis RA and is utilized for directing a collimated laser beam BI from a first optical path P1 towards a direction depending on corresponding rotation states (or rotation angles) of the optical refractive devices with respect to the rotation axis RA. For example, the collimated laser beam from the first optical path P1 is directed towards a direction which can be projected upon a position of a scan region SR; wherein the directed collimated laser beam is referred to as the output laser beam BO. The motion unit 120 is mechanically coupled to the optical refractive devices and is employed for actuating relative motion of the optical refractive devices with respect to the rotation axis RA so as to perform beam scanning based on directing the collimated laser beam BI towards a plurality of directions (or positions) over a period of time on the scan region SR. In addition, the rotation axis RA is aligned to, or parallel to, generally, the first optical path P1.

In FIG. 2, the off-axis reflective unit 210, disposed in the first optical path P1, is utilized for directing the reflected light received by the optical refractive devices towards a second optical path P2. The light detection unit 220, disposed in the second optical path P2, is adopted for performing signal conversion on the reflected light. For example, the light detection unit 220 includes a light detector 221. In another example, the light detection unit 220 may further include a beam splitter 225, such as a polarizing beam splitter (PBS), and a light detector 226, as shown in FIG. 2. For example, the light detector may be implemented using a charge coupled device (CCD) or CMOS device, or any other type of light detector.

Referring to FIG. 2, in an embodiment, the laser unit 100 includes a laser source 101 and a collimating device 105. The collimating device 105, such as a collimator, optically coupled to the laser source 101, is for producing the collimated laser beam BI.

Figure 3:
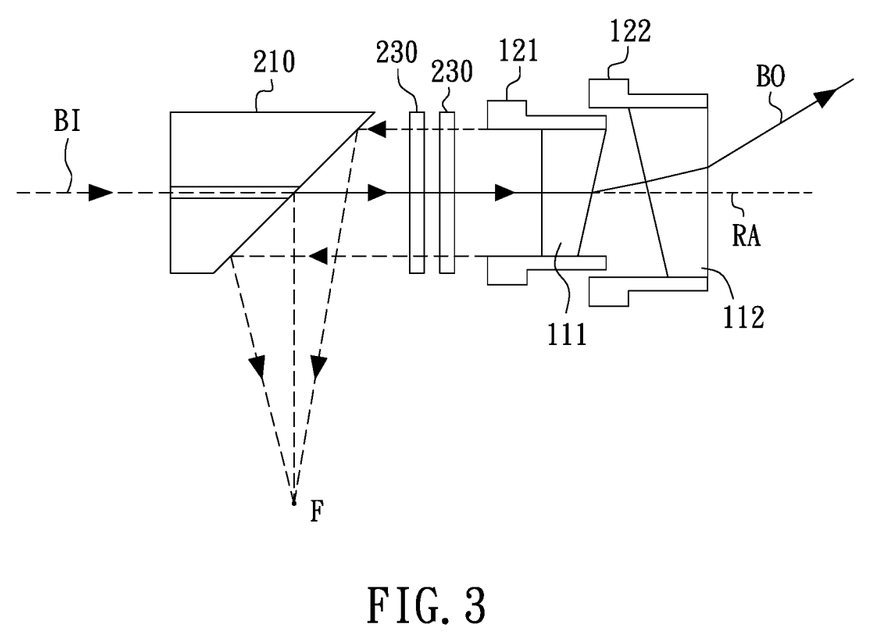
FIG. 3 is a cross-sectional view illustrating a portion of the LIDAR system according to one embodiment of the present disclosure.

Referring to FIG. 3, a portion of the LIDAR system is illustrated according to one embodiment in a cross-sectional view. As shown in FIG. 3, in the optical receiver 20, the off-axis reflective unit 210 includes an off-axis parabolic mirror with at least one hole 211 for the collimated laser beam BI from the first optical path P1 to pass through. The reflected light will be focused at a focus F, as illustrated in FIG. 3, where a light detector may be disposed for signal conversion, as illustrated in FIG. 2.

In an embodiment, the LIDAR system may further comprise one or more polarization switches 230, disposed between the off-axis reflective unit 210 and the beam refractive unit 110, for selectively polarizing either the collimated laser beam BI or the reflected light, or both of them, as shown in FIG. 3. The polarization switch 230, for example, may be a liquid crystal device. However, the present disclosure is not limited to the example of the polarization switch.

In addition, in an embodiment as shown in FIG. 3, the beam refractive unit 110 includes a first optical refractive device 111 and a second optical refractive device 112. The motion unit 120 includes a first motor 121 mechanically coupled to the first optical refractive device 111 and a second motor 122 mechanically coupled to the second optical refractive device 112. For example, the first and second motors 121 and 122 are employed for actuating relative motion of the first and second optical refractive devices 111 and 112 with respect to the rotation axis RA so as to perform beam scanning based on directing the collimated laser beam BI towards a plurality of directions (or positions) over a period of time on the scan region SR. For examples, the first and second motors 121 and 122 are servomotors, stepper motors or any other type of electric motors, such as arc form drive motor, micromotors, ring ultrasonic motor, micro ultrasonic motor, and so on. The first and second motors 121 and 122 may be controlled in response to control signals for directing the collimated laser beam BI towards any direction or position to be required. That is, the direction (i.e. angle with respect to the rotation axis RA) of the output laser beam BO is dependent on the rotation states of the first and second optical refractive devices 111, 112, i.e., the rotation angles which the first and second optical refractive devices 111, 112 are rotated by the first and second motors 121, 122 with respect to the rotation axis RA.

Figure 4:
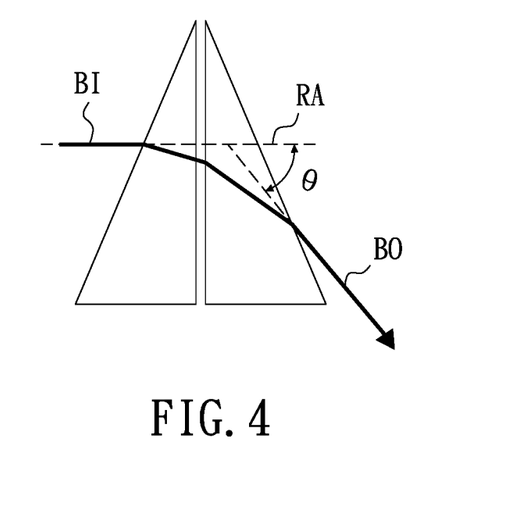
FIG. 4 is a schematic diagram illustrating examples of deviation through rotation angles of two optical refractive devices with respect to a rotation axis.
Figure 5:
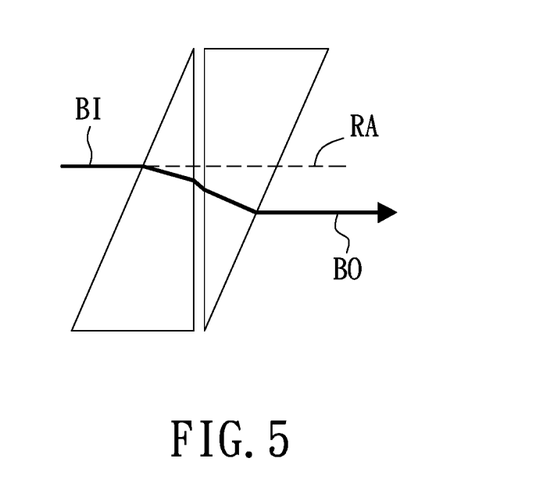
FIG. 5 is a schematic diagrams illustrating examples of deviation through rotation angles of two optical refractive devices with respect to a rotation axis.

The output laser beam BO makes an angle with the collimated laser beam BI, and the angle is referred to as a net deviation angle $\theta$. For example, a maximum net deviation angle and a minimum net deviation angle are made through rotation angles of two optical refractive devices with respect to a rotation axis, as shown in FIGS. 4 and 5, respectively.

Figure 6:
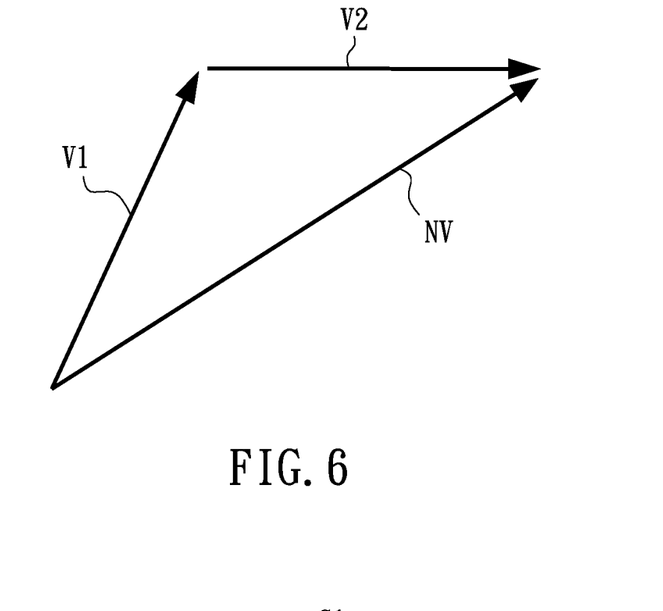
FIG. 6 is a schematic diagram illustrating examples of net deviation of two vectors of two optical refractive devices with respect to a rotation axis.
Figure 7:
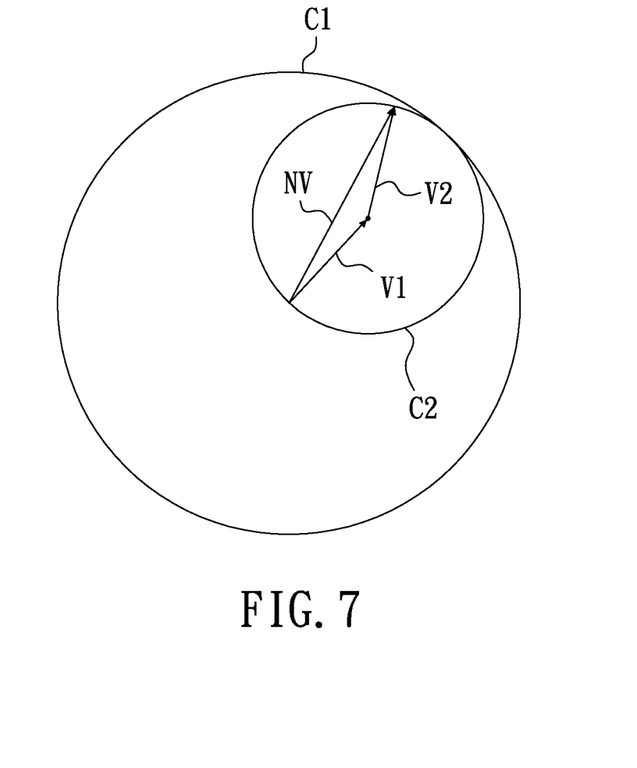
FIG. 7 is a schematic diagram illustrating examples of net deviation of two vectors of two optical refractive devices with respect to a rotation axis.
Figure 8:
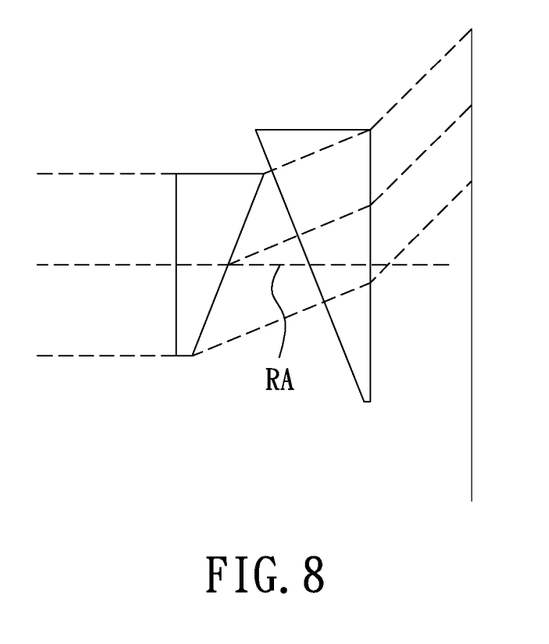
FIG. 8 is a schematic diagram illustrating other examples of beam scanning and reflected light receiving through rotation angles of two optical refractive devices with respect to a rotation axis.
Figure 9:
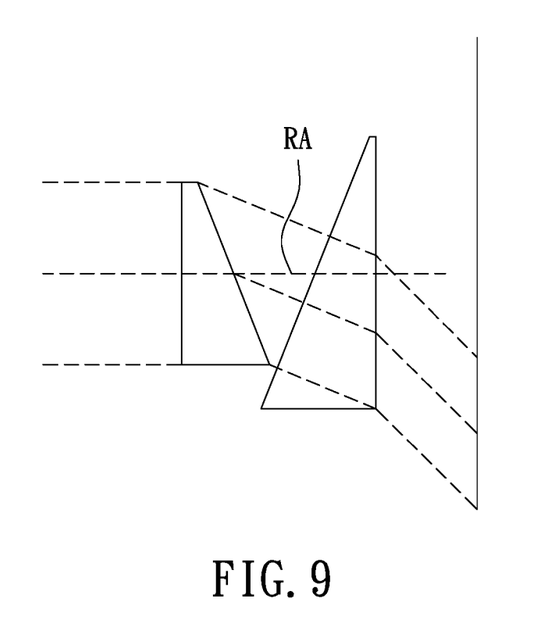
FIG. 9 is a schematic diagram illustrating other examples of beam scanning and reflected light receiving through rotation angles of two optical refractive devices with respect to a rotation axis.

In addition, the net deviation angle may be considered as a vector sum of a plurality of vectors of deviation due to respective optical refractive devices. As illustrated in FIG. 6, a net vector NV is equal to a vector sum of vectors V1 and V2, wherein vectors V1 and V2 indicate respective deviation angles through two optical refractive devices, for example, prisms, with respect to a rotation axis. A net deviation angle at an arbitrary degree or direction can be obtained by way of rotating the two optical refractive devices with respect to a rotation axis, as illustrated in FIG. 7, wherein the net vector NV varies within or on a circle C1, the magnitude of the net vector is within a circle C2, the vectors V1 and V2 are rotatable about the centers of the circles C1 and C2 respectively. As such, a net deviation angle at an arbitrary degree or direction can be obtained by enabling rotation states (or rotation angles) of the two corresponding optical refractive devices with respect to the rotation axis. Further, a scan locus including a plurality of scan positions (or directions) on the scan region SR can also be determined by rotating the two corresponding optical refractive devices with respect to the rotation axis. For example, the motion unit 120 is employed to change the direction of rotation of two or more optical refractive devices so that the output laser beam BO can scan vertically or horizontally at ±X degrees and reflected beam from that direction can be received correspondingly. Net deviation angles of +X and −X degree with respect to the rotation axis are illustrated in FIGS. 8 and 9 with the two optical refractive devices rotated to different angles with respect to the rotation axis. The scan locus, for example, can be, in part or in whole, one or more straight lines or polygons, a spiral locus, a plurality of concentric circles, eclipses, or any pattern.

In an embodiment, the LIDAR system comprises a processing unit 250, electrically coupled to the motion unit 120 and the light detection unit 220, for outputting control signals to the motion unit 120 for performing the beam scanning towards the plurality of directions (positions) on the scan region SR and receiving from the light detection unit 220 a plurality of detection signals corresponding to the plurality of directions (positions) on the scan region SR.

Referring to FIG. 3, in an embodiment, the processing unit 250 is employed for outputting the control signals to the first and second motors 121 and 122 so as to perform the beam scanning based on the first and second motors 121 and 122 rotating in different angular velocities. For example, the output laser beam can scan vertically or horizontally at ±X degree or in other scan locus.

In an embodiment, the processing unit 250 is utilized for generating a detection image corresponding to the scan region, based on the detection signals. The detection signals corresponding to the reflected light that are received can be utilized for reconstruction or rendering of the image of the object(s) or profile of the scan region SR. Since the reflected light corresponding to the output laser beam BO towards a direction is converted to a corresponding detection signal, the energy usage efficiency and sensitivity can be enhanced for image reconstruction or rendering.

In an embodiment, the processing unit 250 is utilized for controlling the motion unit 120 to perform the beam scanning on the scan region SR at a beam scanning rate based on resolution of the detection image to be required, wherein the beam scanning rate indicates number of times per a unit time that the beam scanning is performed on the scan region SR. In this way, number of data points corresponding to the scan region SR can be obtained sufficiently by setting the beam scanning rate. In addition, a database in the backend can also be utilized so as to reconstruct or render the image of the object(s) or profile of the scan region SR. For example, the image is reconstructed or rendered based on a scan locus employed in the beam scanning and the corresponding detection signals received during the beam scanning. In addition, image processing technique such as interpolation or extrapolation method may be utilized if it is needed.

In an embodiment, the processing unit 250 is utilized for controlling the motion unit 120 to actuate the relative motion of the optical refractive devices at an angular speed based on resolution of the detection image to be required. The higher the resolution (or data density) is required, the higher the angular speed can be set.

The embodiments of the LIDAR system are provided according to the present disclosure as above. As compared with the conventional LIDAR system having a beam projection subsystem with a laser light source and a beam detection subsystem with a lens array and detector array for receiving reflected light, i.e., single-beam multi-channel LIDAR system, the embodiments of the LIDAR system according to the present disclosure with a light detection unit can enhance the energy efficiency of the laser signal and further increase the detection range of the system. Since the reflected light corresponding to the output laser beam BO towards a direction is converted to a corresponding detection signal, the energy usage efficiency and sensitivity can be enhanced for image reconstruction or rendering. The complexity of circuit and optical implementation is also reduced and thus the total manufacturing cost is also reduced.

While the present disclosure has been described by means of specific embodiments, numerous modifications and variations could be made thereto by those skilled in the art without departing from the scope and spirit of the present disclosure set forth in the claims.

What is claimed is:

1. A light detection and ranging (LIDAR) system, comprising:
  an optical transmitter for beam scanning on a scan region, and receiving reflected light from the scan region, the optical transmitter including:
  a beam refractive unit, including a plurality of optical refractive devices rotatably disposed with respect to a rotation axis, for directing a collimated laser beam from a first optical path towards a direction depending on corresponding rotation angles of the optical refractive devices with respect to the rotation axis;
  a motion unit, mechanically coupled to the optical refractive devices, including a plurality of motors mechanically coupled to the optical refractive devices, the motion unit being for actuating relative motion of the optical refractive devices with respect to the rotation axis so as to perform beam scanning based on directing the collimated laser beam towards a plurality of directions on the scan region; and an optical receiver for directing the reflected light for signal conversion, the optical receiver including:

an off-axis reflective unit, disposed in the first optical path, for directing the reflected light received by the optical refractive devices towards a second optical path, wherein the off-axis reflective unit includes an off-axis parabolic mirror with at least one hole for the collimated laser beam from the first optical path to pass through;

a light detection unit, disposed in the second optical path, for performing signal conversion on the reflected light;

a plurality of liquid crystal devices serving as polarization switches, disposed in the first optical path between the off-axis parabolic mirror and the beam refractive unit, for selectively polarizing the collimated laser beam and the reflected light;

wherein the motors are employed to change the direction of rotation of the optical refractive devices so that the collimated laser beam polarized by the liquid crystal devices is capable of scanning vertically or horizontally at a positive angle or a negative angle with respect to the rotation axis, and the reflected light is capable of being received correspondingly and directed to the liquid crystal devices along the first optical path for being selectively polarized.

2. The LIDAR system according to claim 1, wherein the optical transmitter further comprises a laser unit:

a laser source; and a collimating device, optically coupled to the laser source, for producing the collimated laser beam.

3. The LIDAR system according to claim 1, wherein the light detection unit comprises a first light detector, disposed on a focus of the off-axis parabolic mirror.

4. The LIDAR system according to claim 3, wherein the light detection unit further comprises a beam splitter and a second light detector; the beam splitter is disposed between the off-axis parabolic mirror and the first light detector; and the beam splitter is disposed between the first light detector and the second light detector.

5. The LIDAR system according to claim 1, further comprising:

a processing unit, electrically coupled to the motion unit and the light detection unit, for outputting control signals to the motion unit for performing the beam scanning towards the plurality of directions on the scan region and receiving from the light detection unit a plurality of detection signals corresponding to the plurality of directions on the scan region.

6. The LIDAR system according to claim 5, wherein the plurality of optical refractive devices including a first optical refractive device and a second optical refractive device, the processing unit is for outputting the control signals to the motion unit so as to perform the beam scanning based on the first and second optical refractive devices rotating in different angular velocities.

7. The LIDAR system according to claim 5, wherein the processing unit is for generating a detection image corresponding to the scan region, based on the detection signals.

8. The LIDAR system according to claim 7, wherein the processing unit is for controlling the motion unit to perform the beam scanning on the scan region at a beam scanning rate based on resolution of the detection image to be required, wherein the beam scanning rate indicates number of times per a unit time that the beam scanning is performed on the scan region.

9. The LIDAR system according to claim 7, wherein the processing unit is for controlling the motion unit to actuate the relative motion of the optical refractive devices at an angular speed based on resolution of the detection image to be required.

* * * * *

UNITED STATES PATENT AND TRADEMARK OFFICE
CERTIFICATE OF CORRECTION

PATENT NO. : 10,884,108 B2  
APPLICATION NO. : 15/823750  
DATED : January 5, 2021  
INVENTOR(S) : Chao-Wen Liang, Shih-Che Chien and Yu-Sung Hsiao Page 1 of 1

It is certified that error appears in the above-identified patent and that said Letters Patent is hereby corrected as shown below:

On the Title Page

Item (72) Inventors Should Read:  
Chao-Wen Liang  
Shih-Che Chien  
Yu-Sung Hsiao  
Li-Tsun Wang Hsinchu City, Taiwan Signed and Sealed this  
Thirteenth Day of September, 2022

Katherine Kelly Vidal  
*Director of the United States Patent and Trademark Office*